United States Patent
Williams

(10) Patent No.: US 9,308,731 B2
(45) Date of Patent: Apr. 12, 2016

(54) NANOCOMPOSITE INKJET PRINTER WITH INTEGRATED NANOCOMPOSITE-INK FACTORY

(71) Applicant: Vadient Optics, LLC., Beaverton, OR (US)

(72) Inventor: George Williams, Portland, OR (US)

(73) Assignee: Vadient Optics, LLC, Beaverton, OR (US)

( * ) Notice: Subject to any disclaimer, the term of this patent is extended or adjusted under 35 U.S.C. 154(b) by 0 days.

(21) Appl. No.: 14/480,426

(22) Filed: Sep. 8, 2014

(65) Prior Publication Data

US 2016/0067974 A1   Mar. 10, 2016

(51) Int. Cl.
*B41J 2/175* (2006.01)
*B01J 19/00* (2006.01)

(52) U.S. Cl.
CPC .............. *B41J 2/175* (2013.01); *B01J 19/0093* (2013.01); *B01J 2219/00819* (2013.01)

(58) Field of Classification Search
CPC ........ C09D 11/30; C09D 11/101; B41J 2/175
USPC .................................................... 347/47, 100
See application file for complete search history.

(56) References Cited

U.S. PATENT DOCUMENTS

| | | | |
|---|---|---|---|
| 6,065,828 A | 5/2000 | Lo et al. | |
| 6,336,704 B1 | 1/2002 | Shimada | |
| 8,646,896 B2 * | 2/2014 | Iftime et al. | 347/99 |
| 2004/0036738 A1 | 2/2004 | Lorenz et al. | |
| 2005/0280678 A1 | 12/2005 | Dibl et al. | |
| 2006/0083694 A1 | 4/2006 | Kodas et al. | |
| 2006/0262235 A1 | 11/2006 | Vogels et al. | |
| 2007/0281099 A1 * | 12/2007 | Howarth et al. | 427/402 |
| 2009/0181177 A1 * | 7/2009 | Li et al. | 427/383.1 |
| 2011/0048171 A1 * | 3/2011 | Enright et al. | 75/345 |
| 2013/0161387 A1 | 6/2013 | King | |
| 2014/0026714 A1 | 1/2014 | Murphy et al. | |
| 2015/0023643 A1 * | 1/2015 | Chartoff et al. | 385/124 |

OTHER PUBLICATIONS

PCT, Intl Search Report and Written Opinion for PCT/US2015/052731, Dec. 15, 2015.

* cited by examiner

*Primary Examiner* — Alessandro Amari
*Assistant Examiner* — Michael Konczal

(57) ABSTRACT

An apparatus for depositing nanocomposite material comprising a nanocomposite-ink factory and inkjet printer. The nanocomposite-ink factory producing nanocomposite-ink and the inkjet printer receiving the nanocomposite-ink. The inkjet printer having a printhead and a positioning mechanism. The printhead having one or more nozzles to dispense nanocomposite-ink droplets.

41 Claims, 5 Drawing Sheets

NANOCOMPOSITE INKJET PRINTER WITH INTEGRATED NANOCOMPOSITE-INK FACTORY

TECHNICAL FIELD

The present invention relates in general to 3-dimensional inkjet printers. The invention relates in particular to nanocomposite inkjet printing with integrated nanocomposite-ink factory to provide nanocomposite-ink for printer deposition.

DISCUSSION OF BACKGROUND ART

Generally inkjet printers require replaceable cartridges. The cartridges, which contain the printable material in a reservoir are installed on a printhead, inside the printer, which dispense the printable material. Some industrial printers have large ink-reservoirs that can be refilled, otherwise when the cartridge runs out of material, the cartridge must be replaced with a new cartridge and the old is either thrown away or recycled for future use. This application relates to another approach.

SUMMARY OF THE DISCLOSURE

The present disclosure is directed to an apparatus for depositing nanocomposite material. In one aspect, the apparatus in accordance with the present disclosure comprises of a nanocomposite-ink factory, the nanocomposite-ink factory producing nanocomposite-ink. An inkjet printer, the inkjet printer having a printhead and a positioning mechanism. The printhead having a nozzle to dispense nanocomposite-ink droplets, wherein the inkjet printer receives the nanocomposite-ink from the nanocomposite-ink factory.

BRIEF DESCRIPTION OF THE DRAWINGS

The accompanying drawings, which are incorporated in and constitute a part of the specification, schematically illustrate preferred embodiments of the present disclosure, and together with the general description given above and the detailed description of preferred methods and embodiments, given below, serve to explain principles of the present disclosure.

DETAILED DESCRIPTION

Figure 1:
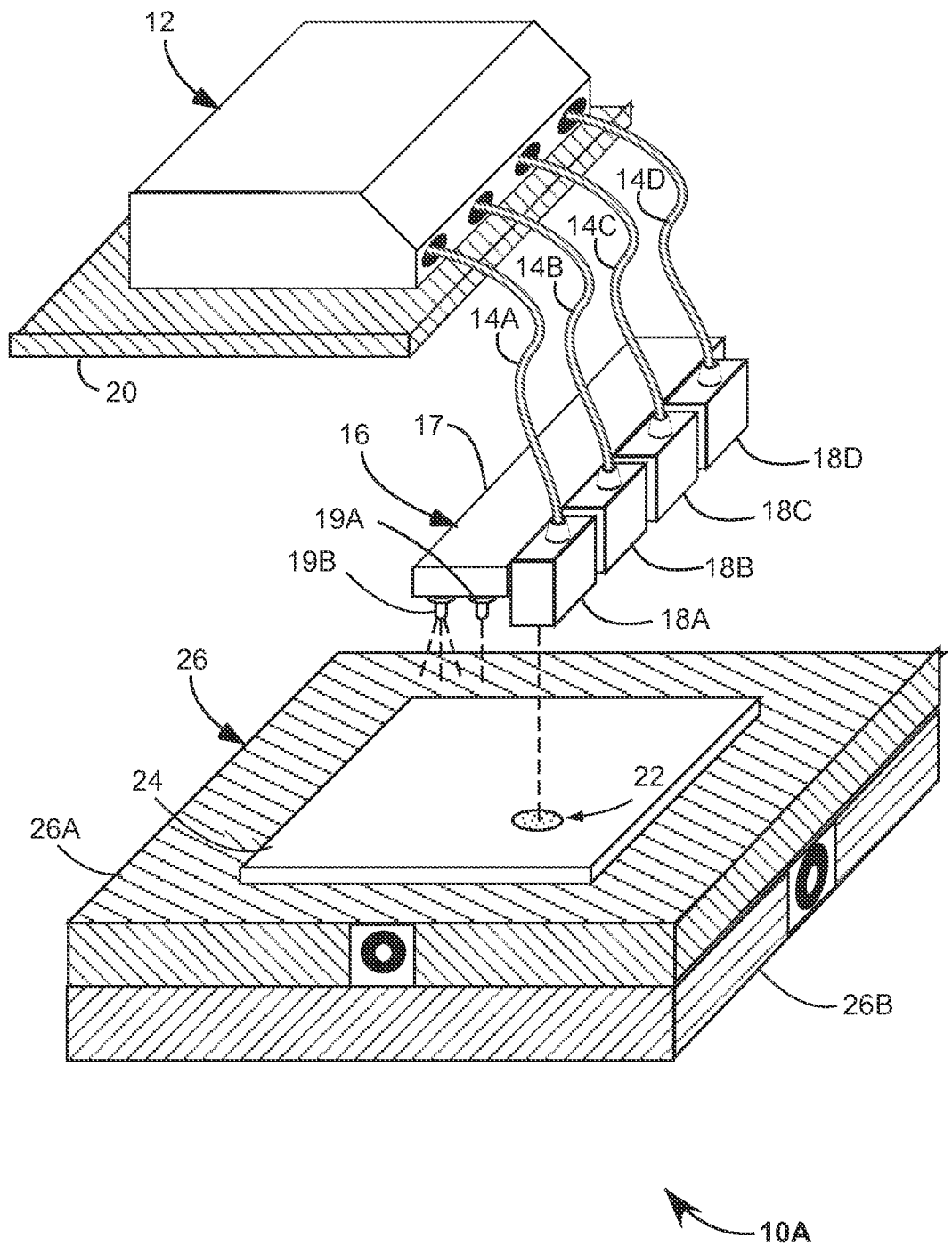
FIG. 1 is a perspective-view, schematically illustrating an apparatus for depositing nanocomposite material in accordance with the present disclosure, the apparatus comprising a nanocomposite-ink factory, the nanocomposite-ink factory producing nanocomposite-ink, and an inkjet printer, the inkjet printer having a printhead and a positioning mechanism, the printhead having a nozzle to dispense nanocomposite-ink droplets, wherein the inkjet printer receives the nanocomposite-ink from the factory.

Referring now to the drawings, wherein like components are designated by like reference numerals. Methods of manufacture and preferred embodiments of the present disclosure are described further herein below.

FIG. 1 is a perspective view, partly in cross-section, illustrating an apparatus 10A for depositing nanocomposite-ink in accordance with the present disclosure. Apparatus 10A comprises a nanocomposite-ink factory 12 and an inkjet printer 16. Nanocomposite-ink factory 12 produces nanocomposite-ink and delivers the nanocomposite-ink to a printhead 18A, 18B, 18C, and 18D via a feedline 14A, 14B, 14C, and 14D, respectively. Here, the feedlines are flexible and ultraviolet opaque. The feedlines can be made out of plastic with inner diameters in the millimeter scale or smaller. The feedlines can be capillary, sized with sufficient inner diameter to allow the nanocomposite-ink to flow, capillary sizes are preferable when the nanocomposite-ink supplied to the inkjet printer in the feedline changes characteristics, as will be described further hereinbelow. Both the nanocomposite-ink factory and the printer are preferably mounted on a gantry type overhead with a factory supporting member 20 and a printhead supporting member 17 shown. An exemplary nanocomposite-ink droplet 22, deposited from printhead 18A, is shown on a substrate 24. Substrate 24 is moved with respect to printheads 18A, 18B, 18C, and 18D with a positioning mechanism 26. Here the positioning mechanism 26 comprises of a linear stage 26A and a linear stage 26B, the two linear stages mounted orthogonally thereby forming a 2-axis stage. Nanocomposite-ink droplet 22 comprises of nanoparticles, or nanofillers, dispersed in a cured organic-matrix, or organic-matrix.

The Printheads each have at least one nozzle, but preferably have multiple nozzles, each independently actuated for nanocomposite-ink dispensing. The printheads are preferably piezo actuated. Alternatively printheads can be thermally actuated, electrostatically actuated, or make use of interrupted continuous flow. Piezo actuated printhead eject ink by a piezo element within the printhead changing shape via applied voltage. The shape change generates a pressure pulse, or acoustic wave, in the fluid, forcing ink from the nozzle in volumes of about 1 picoliter (pl) to about 10 pl for nanocomposite-inks with viscosities that are under about 10 centipoise (cP). Thermally actuated printheads quickly heat and evaporate volatile liquid, often, water, in the ink such that a bubble forms causing displacement of the ink through the nozzle. The nanocomposite-inks with about 10 cP or less, produce droplets of 0.1 pl to 100 pl. Electrostatically actuated printheads use an electrostatically driven microeletromechanical (MEMs) mechanism to impart momentum to droplets of the same general size using the nanocomposite-inks of the same general viscosity. Interrupted continuous flow heads break up a continuous ejection out a nozzle with resonant application of a force perpendicular to the flow resulting in a repeatable, predictable stream of droplets, which can range from about 1 pl to 100 pl making use of fluids with viscosities of 200 cP or less. Droplets that are not required are deflected, using air impingement or electrostatic charge selectively applied, into a recycling channel alongside the trajectory of the droplets to be used. The nozzles should be located in proximity to the substrate on which the nanocomposite-ink is being printed, dependent on the deposition accuracy required. For precise deposition, the printhead should be within a centimeter or less of the substrate.

Substrate 24 can be, or be made from, the group comprising plastics, glasses, metals, ceramics, organic resins, optic glasses, electronic circuits, light sources, wafers, wafers with integrated electronics, and wafers with integrated MEMs devices. The substrate can have features such as integrated cores and alignment features for precision mounting and alignment, free weights for addition of mass to the printed optic for dynamic resonance compensation, and wires to be captured within the optic for use as reticles and/or for heating and cooling. Substrate 24 can become part of the finally printed object or alternatively the substrate can be removed. For applications in which the substrate becomes part of the object, the substrate may be chosen for specific properties. For example, in applications where an optical-element is to be printed, the substrate material may be a transparent glass. The substrate may be a mold material or coated with a releasable material, such as Teflon, with anti-sticking properties, allowing removal of the object from the mold. Alternatively, the substrate may have wetting and non-wetting regions patterned on to the substrate to control position and edge of the printed optic. Further, the substrate may have a three dimensional pocket, either sticking or non-sticking, into which the optical ink is printed to precisely define the boundaries and surface shape.

After deposition of nanocomposite-ink from one of the printheads, substrate 24 can be positioned with respect to a radiation source 19A for selective-curing of the nanocomposite-ink. Selective-curing refers to localized radiation about voxels, activating the organic-matrix. Activation of the organic-matrix solidifies the nanocomposite-ink thereby forming cured nanocomposite. Selective-curing means zero-curing, partial-curing, or fully-curing, which respectively means not solidifying, partially solidifying, or fully solidifying the nanocomposite-ink. Radiation source 19B flood cures the nanocomposite-ink on the substrate. Flood curing is desirable when the all the nanocomposite-ink needs to be partially or fully cured.

The nanocomposite-ink factory and the printer are controlled by a computer. The computer preferably has an optimization algorithm that takes into account numerous factors, described further hereinbelow, synchronizing the production of the nanocomposite-ink based on the nanocomposite-ink required to print an article.

Figure 2:
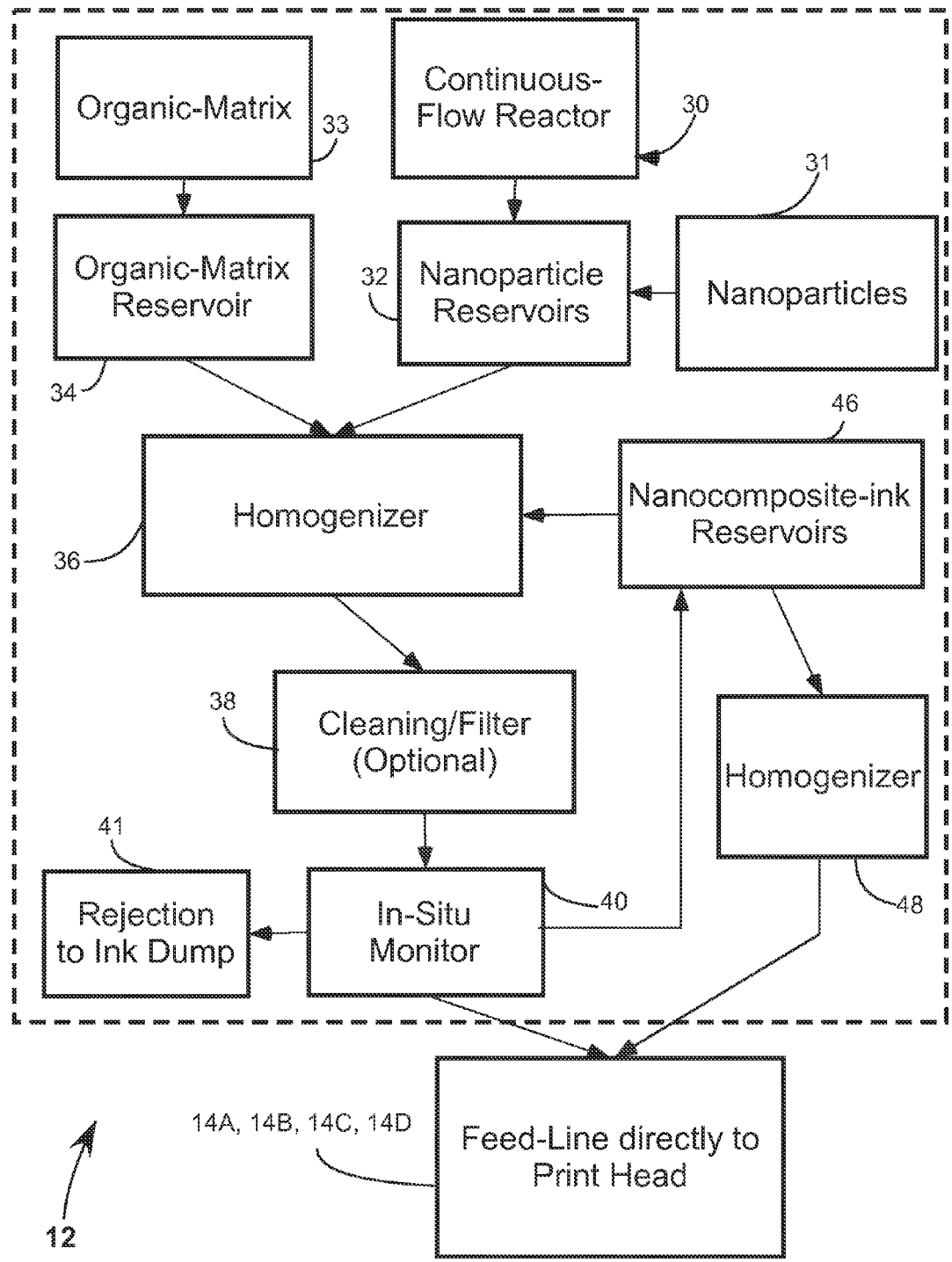
FIG. 2 is a block diagram illustrating the operation of the nanocomposite-ink factory and production of nanocomposite-ink.

FIG. 2 is a block diagram describing a nanocomposite-ink factory 12. Nanocomposite-ink factory 12 has a nanoparticle reservoir 32 and a organic-matrix reservoir 34. The organic-matrix reservoir can store bulk organic-matrix material 33. Nanoparticle reservoir 32 can store a bulk nanoparticles 31 loaded into the nanocomposite-ink factory or the nanocomposite-ink factory can have integrated nanoparticle production. Here, a continuous-flow reactor 30 produces the nanoparticles to be held in reservoir 32, explained in further detail below. While only a single nanoparticle reservoir and a single organic-matrix reservoir are shown, the nanocomposite-ink factory can have multiple reservoirs of each. The materials can be manually fed or alternatively, the organic-host material, nanoparticles, or any other chemicals required for manufacture of nanocomposite-ink can be delivered via a pump. Nanoparticles from reservoir 32 and organic-matrix material from reservoir 34 are combined in a homogenizer 36.

The organic-matrix can be any ink jet printable material. For optical application the organic-matrix material is preferable is ink-jet printable, optically clear, photo-curable resins and monomers. Non-limiting examples of printable organic-matrix material for are cyanoethyl pullulan (CYELP), polyacrylate, hexanediol diacrylate (HDODA), polymethyl methacrylate (PMMA), diethylene glycol diacrylate (DEGDA), Neopentyl glycol diacrylate, tricyclodecane dimethanol diacrylate (TCDDMDA), urea, cellulose, and epoxy resins such as the SU-8 series resists. For optical applications, the nanoparticles are preferably sized sufficiently small with respect to light wavelengths, for those wavelengths intended for use, not to scatter the light.

The nanocomposite-inks can be different by the nanoparticle type, the organic-host matrix type, or concentration of the nanofillers and combinations thereof. The nanoparticles can be oxides, fluorides, semiconductors, ceramics, or metals. Non-limiting examples of nanofillers include beryllium oxide (BeO), aluminum nitride (AlN), silicon carbide (SiC), zinc oxide (ZnO), zinc sulfide (ZnS), zirconium oxide (ZrO), yttrium orthovanadate (YVO$_4$), titanium oxide (TiO$_2$), copper sulfide (CuS$_2$), cadmium selenide (CdSe), lead sulfide (PbS), molybdenum disulfide (MoS$_2$), Tellurium dioxide (TeO$_2$) and silicon dioxide (SiO$_2$) including those with core, hollow core, core-shell, and core-shell-ligand architectures. The refractive-index of the nanocomposite-ink can be modified by the organic-matrix and nanoparticles composition. The nanocomposite-ink can be tuned by the organic-matrix type, the nanofiller type, and the concentration of the nanofillers in the organic-matrix. The refractive-index of a nanocomposite-ink will be the summation by percent volume of the optical properties of the organic-matrix, or organic-host, and the nanofillers. Concentration by volume of the nanoparticles to the organic-host can be about 0.25% to about 70% volume, depending on desired properties. Various examples of nanoparticle and organic-matrix combinations and chemistries is described in U.S. patent application Ser. No. 14/036,660, assigned to the assignee of the present disclosure and the complete disclosure of which is hereby incorporated by reference in its entirety.

Homogenizer 36 mixes the nanoparticles and organic-matrix material such that the nanoparticles are substantially dispersed in the organic-matrix, thereby creating the nanocomposite-ink. Any method or feature which introduces turbulence can help homogenize the nanocomposite-ink. Specific homogenization methods include using static members, shear mixing, or sonification. Static members include plate-type mixers, T-mixers, helical mixers, grids, blades and combinations thereof. For instance the nanoparticles and organic-matrix can be pneumatically pumped through a cylinder pipe section with the static mixing members incorporated within the cylinder, the members cause turbulence as the nanocomposite-ink pass by them, thereby mixing the nanoparticles and the organic-matrix. Such static mixing solutions and design guides for mixing applications are available at Stamixco, LLC., located in the Brooklyn, N.Y., of the United States. Shear mixing can be performed by active movement of mixing member or by high shear mixing. High shear mixers are available at Ross High Shear Mixers located in Hauppauge, N.Y. of the United States. Further, the homogenizer can be, or above methods assisted by, ultrasonic vibration, with in-line solutions available at Sonic & Materials, Inc. located in Newtown, Conn. of the United States. Last, all the above homogenized techniques can be temperature controlled to allow chemical reaction, if appropriate, control vibrational energy, and temperature dependent liquid viscosity.

After homogenization the nanocomposite can, optionally, be passed through a filter 38 to eliminate any agglomerated nanoparticles or otherwise pass through a cleaning process. Cleaning processes, include filtering, bubble removal, chemical cleaning, or evaporation of by-product. For example, if during homogenization any aeration occurred a bubble trap can be implemented to remove bubbles. If chemical by-product or solvent needs to be removed or neutralized, chemicals can be added, evaporative methods can be used. For instance, the nanocomposite-ink can be passed through gas air flow, heating, and low pressure zones in a laminar flow or a cylindrical fluid sheath to maximize surface area.

During and after production, the nanocomposite-ink can be, optionally, monitored by in-situ optical monitor 40. The in-situ optical monitor can be either camera based or a flow-cell type. The camera based monitor can image the nanocomposite-ink as it is being produced to monitor and capture gross defects in the nanocomposite-ink. Examples of such defects that are desirable to monitor with the camera based optical monitor include aeration, coloration, or large agglomeration of nanoparticles. The flow-cell type optical monitor uses a scattering technique in which light impinges on the flow-cell as the nanocomposite-ink is passes through the flow cell. A photodetector captures the forward scattered light passing through the flow-cell. If large particles or agglomeration of particles occur, then the light will scatter at other angles and the photodetector signal will drop, indicating a defect. More advanced flow-cell methods can additionally capture side scatter and allow for more precise determination of nanoparticle size or agglomeration size. Monochromatic light passing through the cell, can be detected to determine the transmissive, reflective, or absorbing properties of the inks Broadband light with a dispersive element before the detecting element can be used determine the spectral properties of the inks. Similarly, optical stimulations can be used for Raman Spectroscopy, Spectral Luminescence, Pump-probe spectroscopy or other analytical technique that can be used to characterize the properties of the ink and its components. Further, implementation of an angled or prism shaped flow-cell allows determination of the refractive index of the nanocomposite-ink by measuring the angle of the exiting refracted beam. The nanocomposite-ink that is undesirable can be rejected into ink-dump 41 or otherwise the desirable nanocomposite-ink pass via feedline 14A, 14B, 14C, 14D directly to one of the printheads or into the appropriate nanocomposite-ink reservoir 46. Additionally, the optical monitor and the various types of optical monitoring can be implemented at any point along the process and provide feedback.

The nanocomposite-inks that are stored in the nanocomposite-ink reservoirs 46 can be fed to the printhead as desired via connection to one of the feedlines 14A, 14B, 14C, or 14D. Additionally if any mixtures of the nanocomposite-inks are desired, then they can be sent into homogenizer 48 for mixture and delivery to the printheads. Further if the nanocomposite-ink in one of the reservoirs can be used in production of nanocomposite-ink, it can be sent to the homogenizer 36 in place of the organic-matrix material, or in addition to it. While the nanocomposite-ink factory is especially well suited for production of the nanocomposite-ink, it can also have reservoirs for traditional 3-dimensional printing materials and composites.

Figure 3:
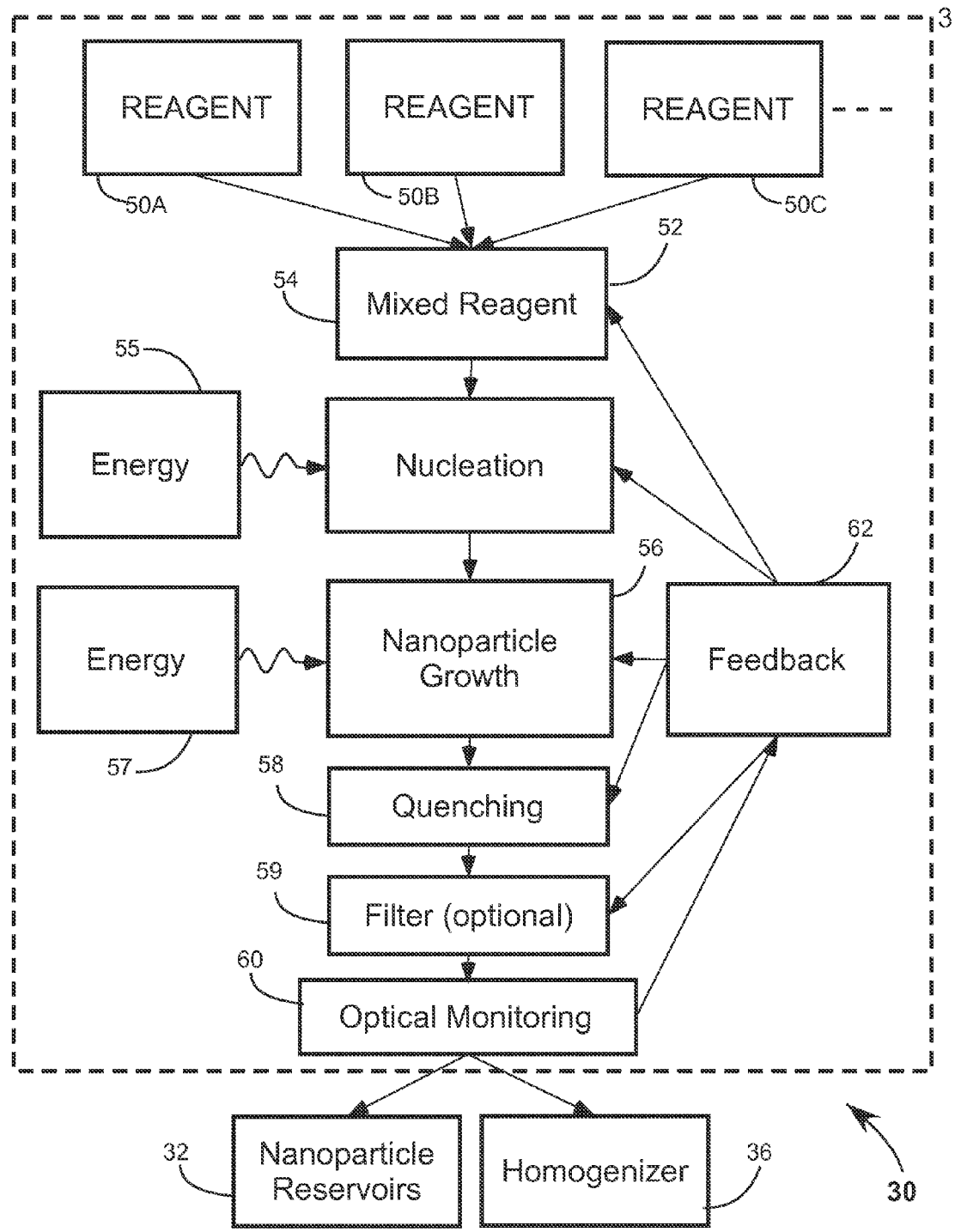
FIG. 3 is a block diagram, illustrating the operation of a continuous flow reactor which can be incorporated within the nanocomposite-ink factory.

FIG. 3 is a block diagram describing operation of the continuous flow reactor 30. Continuous flow reactor 30 is an optional addition to the nanoparticle-ink factory which can provide on-demand custom nanoparticle production. Continuous flow reactor 30 has a reagent reservoir 50A, 50B and 50C which contain precursors, additives, solvents and ionic liquids necessary for production of nanoparticles. While only three are shown, the continuous flow reactor can have as many reagent reservoirs as required nanoparticle production. The necessary reagents used to produce nanoparticles and accompanying chemistry supplies can be found at Sigma-Aldrich in St. Louis Mo. of the United States. Each of the reagent reservoirs are heat controlled maintained at pre-set temperatures. The reagent are mixed in a mixed reagent zone 52 such that a Reynolds number range from about 150 to about 300 is achieved to ensure quality mixing within a reasonable volume. Any mixing or homogenizing technique can be used dependent on the necessary flow rate. For instance standard static T-mixer is sufficient for flow rates up to 100 mL/min, such as low pressure T-mixer part number P-714, available at IDEX Health and Science in Oak Harbor, Wash. of the United States. Increased flow can be obtained by utilizing parallel channels or different mixing techniques as previously described in the homogenization process. To transport the mixed reagents through the tubing of the Continuous flow reactor "plug flow" is a preferable method. "Plug flow" transport allows inert gas buffer "plugs" of the mixed reactant such that the reactant is segmented by the inert gas during transport. The "plug" self-mixes via friction with the tube walls.

Mixed reagent 52 enters a nucleation zone 54 in which an energy source 55 is uniformly applied to heat the mixed reagent and decompose the injected precursors and initiate nucleation reaction forming the nanoparticles. The heat can be generated in a variety of ways such as convective heat (such as liquid metal, oil and water baths), radiant-heat, microwave, laser, or conductive heating (such as joule heating, chemical reaction, combustion, or nuclear decay). Preferably the mixed reagent experiences a rapid temperature ramp such that the heat energy rapidly decomposes precursors and any barrier to nucleation thereby allowing a high rate of nucleation. When it is desirable to have a uniform nanoparticle size distribution it is important that the temperature be sufficiently short in duration to prevent nanocrystal growth after the initial nucleation. This ramping process ensures nanoparticles are the same size when a uniform size distribution is desired.

The nucleated particles, or the nanoparticles, are transported to a nanoparticle growth zone 56. The nanoparticles are heated by an energy source 57 at constant temperature, lower than that required for nucleation. The heating allow the nanoparticles to grow in a controlled manner. Convective heat (such as liquid metal, oil and water baths), radiant-heat, microwave, laser, or conductive heating (such as joule heating, chemical reaction and combustion, or nuclear decay) can be used to heat the nanoparticles. The rate at which the nanoparticles are pumped through the system, the temperature of the system, and the heat transfer to the nanoparticles determine the rate of growth. After appropriate growth to the desired nanoparticle size the nanoparticle are quenched to stop growth.

At a quenching zone 58 the growth of the nanoparticles is terminated by reduction in temperature. If needed, solvents are added for chemical quenching thereby stopping any additional chemical reactions and to create the nanoparticle dispersion. A filter 59 is an optional purification stage to remove any non-reacted regents, secondary reaction products or solvents. Filter 59 can incorporate decanting, in-line centrifuge, membrane filters, and solvent evaporators as well as temperature control. An optical monitor 60, which is preferably a flow-cell optical monitor, as described above, measures the nanoparticle characteristic and based on those characteristics provides feedback 62 for process control. The nanoparticle dispersion is then either held in an appropriate nanoparticle reservoir 32 or sent directly to homogenizer 36 for nanocomposite-ink production.

The continuous flow reactor in the printing apparatus may be a macro system with traditional tube flow design, use a microreactor, or combination of both. Traditional flow design allows for larger scale nanoparticle production. The microreactors use microfluidic channels with less output capacity but with modular design. The microreactors can achieve greater output with multiple channels, each of the channels with its own microfluidic reaction chamber. For the printing apparatus which requires multiple nanoparticle sizes or types to be produced simultaneously, multiple continuous flow reactors, of either, or combinations of the two designs can be utilized.

Figure 4:
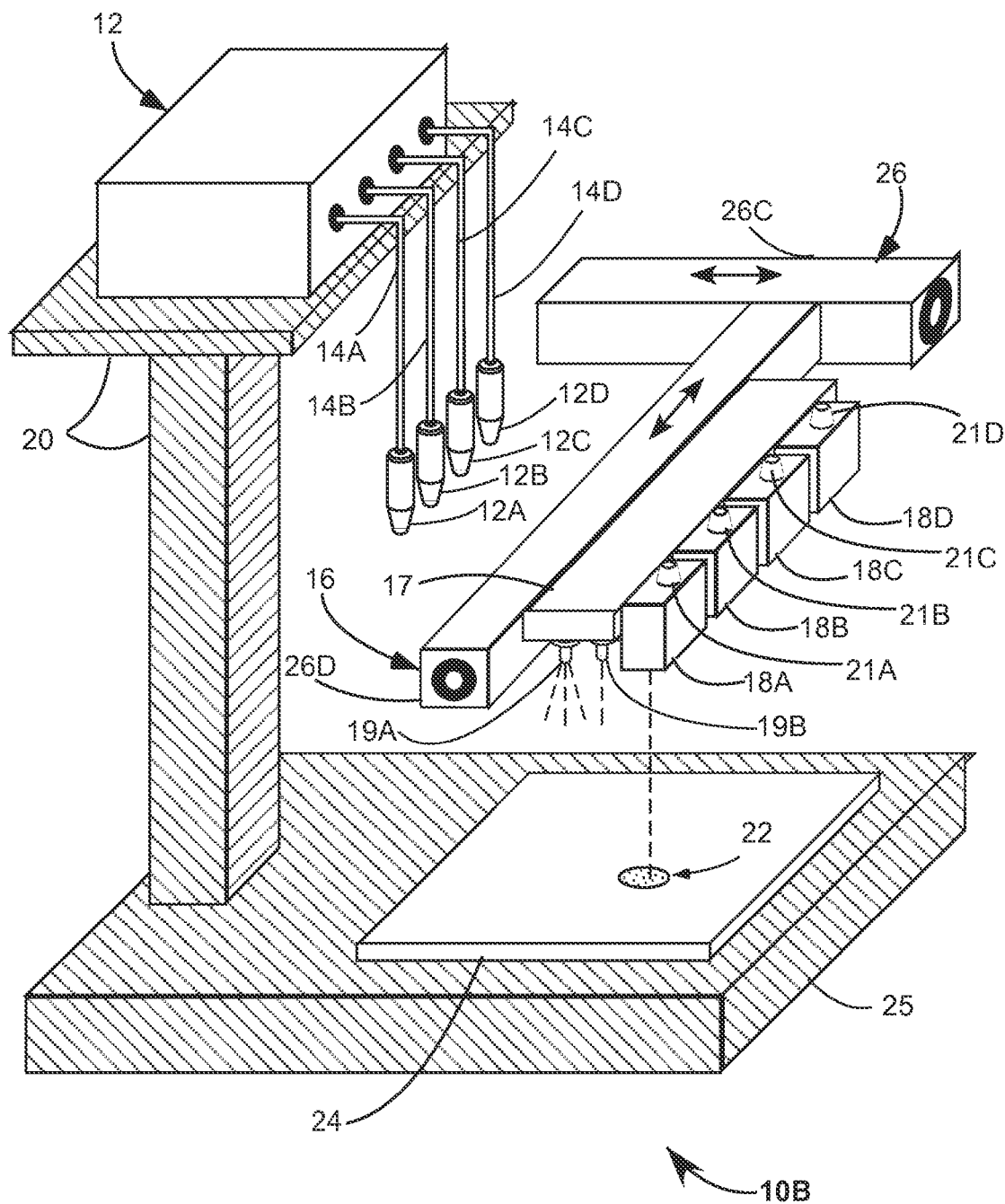
FIG. 4 is a perspective view, schematically illustrating the apparatus for depositing nanocomposite-ink, wherein the printer receives the nanocomposite-ink from the nanocomposite-ink factory via a docking station.

FIG. 4 is a perspective view of printing apparatus 10B in accordance with the present disclosure. Printing apparatus 10B is similar to printing apparatus 10A as shown in FIG. 1. Here in FIG. 3 printing apparatus 10B has printheads 18A, 18B, 18C, and 18D that dock to nanocomposite-ink factory 12 for periodic refill of the nanocomposite-ink, thereby eliminating the need to direct connection to the nanocomposite-ink factory. Printheads 18A, 18B, 18C, and 18D each have a receiving interface 21A, 21B, 21C, and 21D, respectively, to receive nanocomposite-ink from a nanocomposite-ink dispensers 12A, 12B, 12C, or 12D which receive the nanocomposite-ink from factory 12 via respective feedlines 14A, 14B, 14C, and 14D. Here, the feedlines are stationary and can be made from rigid material such as glass or metal tubes. In this embodiment, positioning mechanism 26 comprises of a linear stage 26C and an orthogonally gantry mounted linear stage 26D, which allows planar positioning of the printheads, the printheads mounted to linear stage 26 via member 17.

Here, positioning mechanism 26 is preferably mounted to an overhead type gantry system, not shown. Substrate 24 is mounted on stationary platform 25 via vacuum chuck suction to prevent movement of the substrate during printer operation. A stationary platform 25 supports pedestal 20 which supports the nanocomposite-ink factory. Alternatively the nanocomposite-ink factory could be supported by a gantry type system.

Figure 5:
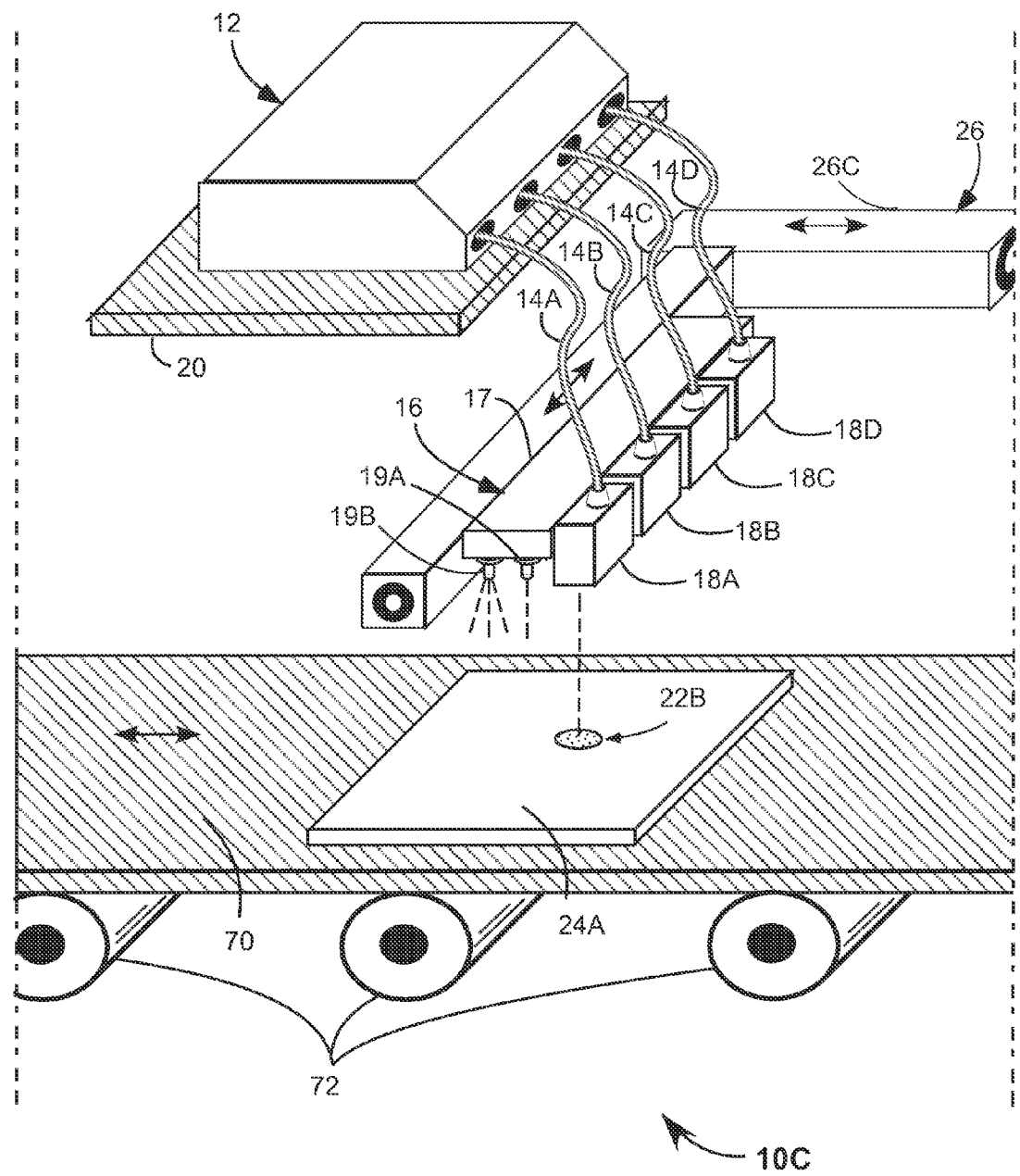
FIG. 5 is a perspective view, schematically illustrating the apparatus for depositing nanocomposite-ink wherein the apparatus uses roll-to-roll processing.

FIG. 5 is a perspective view of a printing apparatus 10C. Printing apparatus 10C is similar to printing apparatus 10A as shown in FIG. 1, except here in FIG. 5, printing apparatus 10C uses roll-to-roll processing or conveyor-belt processing. Here substrates 24 move along a conveyor-belt 70, allowing for production processing. The conveyor belt is supported by a caster mechanism 72. The overhead positioning mechanism system is the same as shown in printing apparatus 10B in FIG. 4 allowing for continuous movement of the conveyor belt and backtracking of the printheads. Alternatively the conveyor belt could be utilized to position the substrate with respect to the printhead in at least one-axis.

Conveyor belt 70 can be used itself as the substrate in roll-to-roll manufacturing. Alternatively conveyor belt 70 surface can be a releasing surface or be treated by a releasing agent which allows for removal from the conveyor belt after printing and curing. The conveyor belt can have divots, bumps, or other features that allow the printed material to conform and retain the shape or shapes on the conveyor belt. Additionally the casters can be positioned such that the conveyor belt obtains a similar radius to the caster to allow for complex printing geometries.

Generally, the positioning mechanism in the printing apparatus can be such that the substrate moves under the printhead or the printheads moves over the substrate. Additionally, multi-axis degrees of freedom such as gimbal mounts and vertical axis movement can be provided to allow complex shapes to be printed. Small complex shapes or patterning, such as optical waveguides, can be made by implementing, a nanoprinter which are commercially available from Obducat AB, in Lund of Sweden, which could be integrated, or modified to integrate, within the printing apparatus. In addition, a machine-vision system can be added to monitor the deposition of the nanocomposite-ink and also provide spatial reference of the printed material. For example, a camera can detect the shape of the printed material or use reference marks to locate the printhead relative to the substrate. A line-scanner can provide detailed 3-dimensional models of printed material and features on the substrate.

The aforementioned computer must control and take into account the aforementioned variables and characteristics of the printing apparatus to appropriately produce and supply the nanocomposite-ink from the factory to the inkjet printer. Generally, the computer will take into account the particular requirement of the article to be printed, determine a recipe for the article based on the article characteristics, and generate a queue for production of the required nanocomposite-inks and distribution of the nanocomposite-inks to the printheads. For instance, a positive GRIN lens, can have either a predetermined recipe or the optimizer can generate a recipe based on characteristics such as focal length, diameter or shape, spectral properties, and required performance of such characteristic. Generation of the recipe and then nanocomposite-ink will depend on the types of nanoparticles, organic-host, and nanocomposite-ink currently available in the respective reservoirs. Further, the type of nanocomposite-ink produced will depend on the refractive-gradient requirements and whether the gradient in any particular area will be formed primarily by diffusion, and intermixing of different concentrations of nanocomposite-ink upon deposition, as described in references, described further hereinbelow, or by production of intermediate nanocomposite-inks.

For the continuous flow reactor, the computer must take into account the type of reagents utilized, the rate of chemical reactions, the temperature, and the flow through any tubing. The flow through the system in any particular area will in turn depend on viscosity, the diameter of the tube or apparatus, the temperature, and the material. The flow can be calculated, or preferably measured with an in-line flow meter. The computer will also take into account the nucleation temperature, the ramp cycle of the nucleation, the temperature during growth, the flow rate through the nanoparticle growth cycle, and then control and optimize the continuous flow reactor operation based on the in-situ optical monitoring. Likewise, during the factories homogenization process, the computer will control the amount of time spent in homogenization based on feedback from the optical-monitoring.

The rate of production of the nanocomposite-ink factory will depend on the deposition rate of the inkjet printer. The deposition rate will depend on the number of printheads, the number of nozzles on the printheads, the velocity of ejected droplets, the temperature of the ink, the angle of deposition, the size of the droplets, the rate of the droplet deposition, the distance from the substrate to the printhead, the required location of the droplets, the curing process and curing intervals, and the speed of the positioning mechanism. Again, optical monitoring of the printhead deposition can provide the computer the necessary feedback to control the printhead deposition and in turn adjust and optimize production of the nanocomposite-ink.

The computer can also control the nanocomposite-ink that will be rejected. For instance, the nanocomposite-ink can intermix when traveling through the feed-lines. When the nanoparticles characteristic requirement changes, such as nanoparticle type or concentration, the feedline will a transition between the nanocomposite-inks, which may intermix. With larger inner diameters, more intermixing will result. While preferably the recipe generated is optimized to use the intermixed nanocomposite-ink, if the intermixed nanocomposite-ink is unusable in the generated recipe, the computer will deposit the unusable nanocomposite-ink in the ink-dump.

The printing apparatus and various embodiments described above has a variety of useful applications. In general, the printing apparatus can be used to print nanocomposite 3-dimensional objects. It is especially suited well for printing graded index refractive optics, optical system, and subsystems. For instance, the nanocomposite-ink can be chosen and structured to create an optical-element that compensates chromatic aberration or increase chromatic dispersion, see U.S. patent application Ser. No. 14/278,164, assigned to the assignee of the present disclosure and the complete disclosure of which is hereby incorporated by reference in its entirety. Further, electro-optic nanofillers can be utilized in the optical-device and implemented to manufacture electro-optic modulators, see U.S. patent application Ser. No. 14/278,164, assigned to the assignee of the present disclosure and the complete disclosure of which is hereby incorporated by reference in its entirety. Similarly, optically nonlinear (NLO) nanofillers can be utilized in the optical-device and implemented to achieve optically nonlinear effects for applications which require optical limiting, see U.S. patent application Ser. No. 14/293,574, assigned to the assignee of the present disclosure and the complete disclosure of which is hereby incorporated by reference in its entirety. For printing Fresnel type gradient optics, see U.S. patent application Ser. No. 14/299,777 and for printing optical-elements with integrated conductive paths, see U.S. patent application Ser. No. 14/307,071, both assigned to the assignee of the present disclosure and the complete disclosures of which is hereby incorporated by reference in its entirety.

From the description of the present disclosure provided herein one skilled in the art can construct the disclosed printing apparatus in accordance with the present invention. Those skilled in the art to which the present invention pertains will recognize that while above-described embodiments of the inventive printing apparatus and method of manufacture are exemplified using particular configurations, others may be used without departing from the spirit and scope of the present invention.

In summary, the present invention is described above in terms of particular embodiments. The invention, however, is not limited to the embodiments described and depicted herein. Rather, the invention is limited only by the claims appended hereto.

What is claimed is:

1. An apparatus for depositing nanocomposite material, the apparatus comprising:
    a nanocomposite-ink factory, the nanocomposite-ink factory producing a nanocomposite-ink, the nanocomposite-ink being a nanoparticle and an organic-matrix composition; and
    an inkjet printer, the inkjet printer having a printhead and a positioning mechanism, the printhead having a nozzle to dispense the nanocomposite-ink, wherein the inkjet printer receives the nanocomposite-ink from the factory; and
    wherein the factory has a continuous flow reactor, the continuous flow reactor producing the nanoparticles.

2. The apparatus of claim 1, wherein the factory has a nanoparticle reservoir and an organic-matrix reservoir, the factory forming the nanocomposite-ink by mixing the nanoparticles and the organic-matrix.

3. The apparatus of claim 2, wherein the factory has a plurality of nanoparticle reservoirs.

4. The apparatus of claim 1, wherein the factory has a plurality of nanocomposite-ink reservoirs, each of the plurality of nanocomposite-inks having different nanoparticle concentrations, the factory mixing the plurality of nanocomposite-inks.

5. The apparatus of claim 1, wherein the continuous flow reactor comprises of a microreactor, the microreactor having a plurality of reaction cells and a plurality of channels, wherein the plurality of channels are in fluid communication with one another.

6. The apparatus of claim 1, wherein the continuous flow reactor comprises of a macro-reactor and a microfluidic reactor.

7. The apparatus of claim 1, wherein the continuous flow reactor has in-situ optical monitoring for computer process control and feedback.

8. The microfluidic reactor of claim 1 wherein the apparatus has a surface transparent to electro-magnetic or electro-optical radiation.

9. The apparatus of claim 1, wherein the nanoparticles are contained in a solvent.

10. The apparatus of claim 1, wherein the continuous flow reactor changes the nanoparticle characteristics based on the inkjet printer deposition requirements.

11. The apparatus of claim 1, wherein the inkjet printer has a plurality of printheads.

12. The apparatus of claim 1, wherein the printhead is piezo actuated.

13. The apparatus of claim 1, wherein the printhead is thermally actuated.

14. The apparatus of claim 1, wherein the printhead is electrostatically actuated.

15. The apparatus of claim 1, wherein the printhead has continuous flow.

16. The apparatus of claim 1, wherein the printhead has a plurality of the nozzles.

17. The apparatus of claim 1, wherein the printhead has in-situ optical monitoring and feedback.

18. The apparatus of claim 1, wherein the inkjet printer receives the nanocomposite-ink from the factory via a feed-line, the feed-line directly connecting the factory to the printhead, such that the elements of the channels are in fluid communication with one another.

19. The apparatus of claim 1, wherein the inkjet printer receives the nanocomposite-ink from the factory via a docking station, the docking station having a dispenser located such that the positioning mechanism can move the printhead underneath the dispenser and receive the nanocomposite-ink from the dispenser into mobile reservoirs.

20. The apparatus of claim 1, wherein the inkjet printer has an optical camera to monitor the nanocomposite-ink deposition characteristics.

21. The apparatus of claim 1, wherein the positioning mechanism is a multi-axis mechanical stage capable of moving the printhead in a plane.

22. The apparatus of claim 1, wherein the positioning mechanism is a multi-axis mechanical stage capable of moving a substrate with respect to the printhead.

23. The apparatus of claim 1, where the positioning mechanism includes a 1-axis stage.

24. The apparatus of claim 1, wherein the positioning mechanism incorporates roll-to-roll processing.

25. The apparatus of claim 1, wherein the positioning mechanism moves the printhead above the fixed substrate.

26. The apparatus of claim 1, wherein the position mechanism moves the substrate, below the fixed printhead.

27. The apparatus of claim 1, wherein the positioning mechanism moves the printhead and the positioning mechanism moves the substrate.

28. The apparatus of claim 1, wherein the concentration of nanoparticles in the nanocomposite-ink supplied to, one or more of, the printheads changes during printing.

29. The apparatus of claim 1, wherein a computer controls the printing apparatus.

30. The apparatus of claim 29, wherein the computer controls production of the nanocomposite-ink in proportion to the rate of printing.

31. The apparatus of claim 29, wherein the computer controls production of the nanocomposite-ink in proportion to the rate of the motion of substrate beneath the printheads.

32. The apparatus of claim 29, wherein the computer controls the manufacture of the nanocomposite-ink in proportion to the rate of the motion of the printheads.

33. The apparatus of claim 29, wherein the computer synchronizes the properties of the nanocomposite-inks, the properties of the printheads, and the motion of the printheads.

34. The apparatus of claim 1, wherein the temperature of the printhead is changed in synchronization with the manufactured nanocomposite-inks.

35. The apparatus of claim 1, wherein the deposition velocity of deposited nanocomposite-ink from the printhead changes in synchronization to the properties of the nanocomposite-inks deposited.

36. The apparatus of claim 1, wherein the substrate is patterned with wetting and non-wetting regions to control the location of the printed optic.

37. The apparatus of claim 1, wherein the substrate carries components which can be encapsulated in the nanocomposite-ink.

38. The apparatus of claim 1, wherein the nanocomposite-ink is transparent in one or more regions of the electro-optical spectrum including to gamma rays, x-rays, visible, short wavelength infrared, or thermal infrared.

39. The apparatus of claim 1, wherein the nanocomposite-ink is transparent in one or more regions of the electromagnetic spectrum including to microwave, millimeter-wave, or radio frequency radiation.

40. The apparatus of claim 1, wherein the nanoparticles are from the group consisting of semiconductors, metal oxides, metal nitrides, metal chalcogenides, fluorides, sulphides, graphene, graphite, ceramics, and metals.

41. The apparatus of claim 1, further comprising a nano-printer.

* * * * *